Nov. 4, 1952 G. J. MAKI 2,616,969
FREQUENCY SHIFT RADIO TELEGRAPH RECEIVER
Filed Oct. 18, 1948
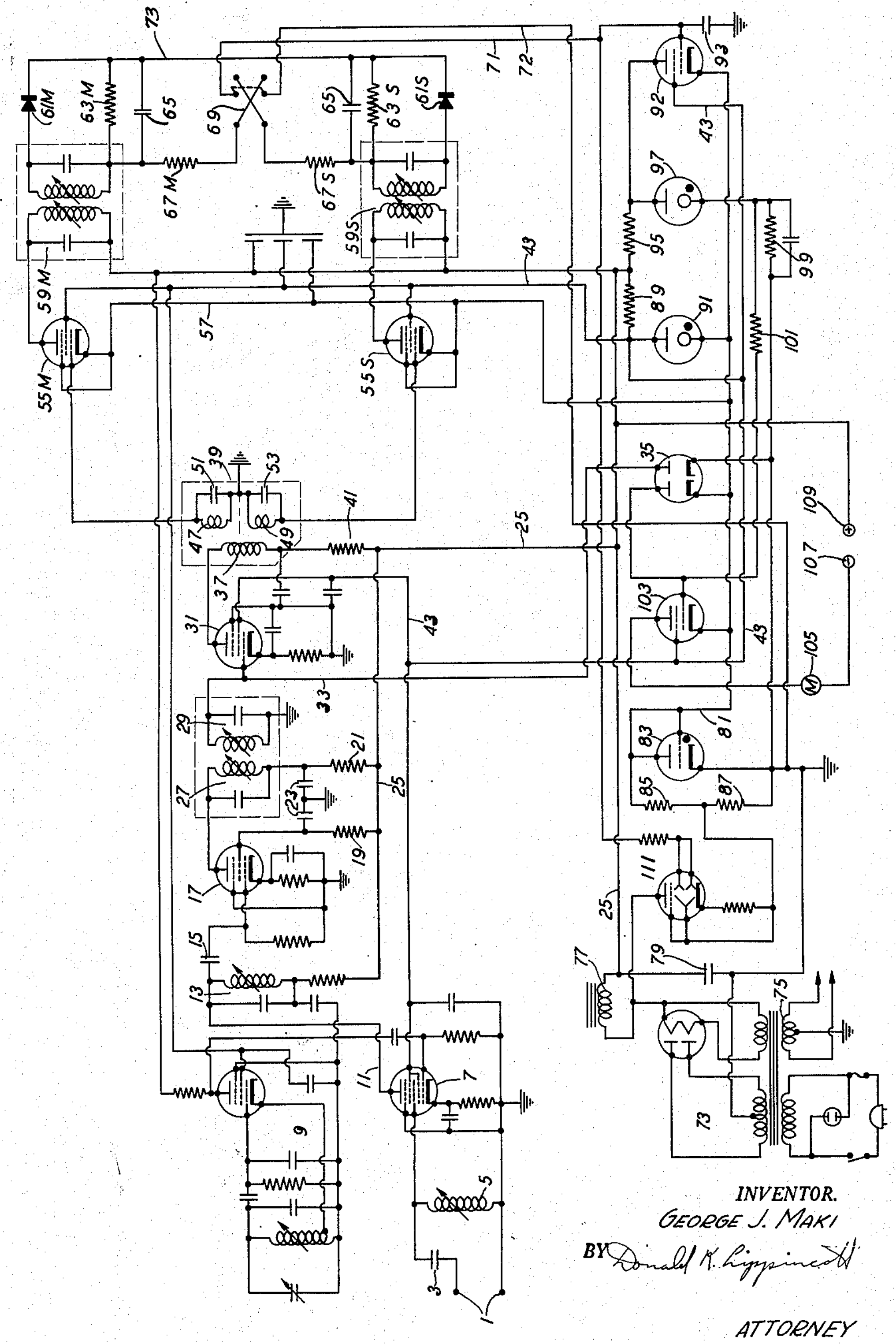
INVENTOR.
GEORGE J. MAKI
BY Donald K. Lippincott
ATTORNEY Patented Nov. 4, 1952 2,616,969

UNITED STATES PATENT OFFICE 2,616,969

FREQUENCY SHIFT RADIO TELEGRAPH RECEIVER

George J. Maki, Moraga, Calif.

Application October 18, 1948, Serial No. 55,109

8 Claims. (Cl. 178—88)

This invention relates to receivers for radio telegraph signals of the frequency-shift type, and particularly to such receivers adapted for use with printer telegraph equipment.

Telegraph systems of the kind referred to differ from more familiar types in that instead of the radio wave being transmitted only during the period when a "mark" signal is being sent, and interrupted or suppressed completely during the spaces, the wave is transmitted at all times, but its frequency is altered as between the mark and the space signals. The interrupted method of transmission has, in theory, much in common with amplitude modulation in radio telephony. The frequency shift system is more closely related to frequency modulation in telephony, but it differs from the latter in certain important respects. A frequency modulation telephone signal varies about a mean or carrier frequency, and during interruptions in transmission, and, in fact, twice in every cycle of the modulating wave, the carrier frequency is itself transmitted. In frequency shift telegraph, the carrier is never transmitted; the frequency shifts suddenly as between mark and space, and while there may be considered to be a hypothetical carrier which would be the arithmetic mean between mark and space frequencies, this "carrier" would not, in general, be the average frequency if the waves were integrated with respect to time.

When radio telegraph signals of any character are used to operate printer telegraph equipment especial precautions are necessary to supply proper voltages and wave forms to the printer in order to prevent misprints. When signals are received by ear, the operator may distinguish between a weak signal and a stronger signal by heterodyning the received signal to a distinguishing tone, and listening for this particular tone. In the mechanical receiving system this particular type of discrimination is not possible. Printer systems are therefore particularly susceptible to malfunction when amplitude changes due to fading and, as well, to interference from other signals or from atmospherics. To avoid these effects insofar as is possible diversity reception is used, wherein the signals are received and detected in a number of different circuits fed from spaced antennas, and the outputs combined. This involves the use of much apparatus, and while, in general, it is sufficient to overcome fading effects, interference may still cause misprints which, at best, are highly annoying, and under severe conditions can result in complete disruption of communications.

Radio communication channels are extremely valuable. The communication spectrum is extremely crowded and it is therefore very important that channel width be conserved. In order to do this the frequency-shift employed is made as narrow as possible in view of the necessity of separating definitely and distinctively the mark and space frequencies; in practice the difference in the frequencies employed is usually somewhere between five hundred and one thousand cycles. A great majority of the circuits used for radio telegraph communication now lie within the upper ranges of the frequency spectrum, i. e., in the range from, say, ten to thirty megacycles, with the probability that much higher frequencies, in the microwave range, will be used in the near future. Separation of frequencies by tuning is dependent upon the percentage difference in the frequencies involved, and to differentiate between frequencies only a thousand cycles or less apart at the actual transmission frequencies is a practical impossibility. It has accordingly been the custom to convert frequency-shift signals down into the voice range, where the percentage difference in frequency is relatively large. Separation of frequencies within the voice range having a difference of five hundred cycles or so is not, technically, too difficult, but it does involve relatively large and expensive filters.

The object of this invention is to provide a receiving system for frequency-shift telegraph signals which will supply clear-cut, well-shaped pulses to a telegraph printer under adverse conditions of reception; which does not, under ordinary conditions of use, require diversity reception, although it may be used with the same; which is highly resistant to atmospherics as well as to interfering signals; which uses no filters in the accepted sense of that term; and which is simple and economical in construction.

Stated broadly, my invention involves the use of a conventional receiver of the superheterodyne type feeding an intermediate transformer which operates at a frequency which is not critical, but which may be of the order of 55 kilocycles. The intermediate transformer feeds two sharply tuned circuits, one of which has its maximum response at the mark frequency while the other is tuned to the space frequency. Instead of feeding into the ordinary detector or discriminator circuits, these two selective circuits feed respectively into a pair of intermediate frequency amplifier tubes, both of which are biased to well below their cut-off point, so that they will not respond to any signal which does not exceed, in amplitude, a definite minimum value, this value being preferably set, for the "mark" tube, at aproximately the value to which its connected selective circuit will respond to space signals, and vice versa. The output circuits of the two tubes are coupled to rectifier circuits which, in turn, are connected in opposition in a common output circuit so that the polarity appearing in this circuit is reversed in accordance with whether a mark or a space signal is being received.

The intermediate frequency amplifier is preferably provided with excess amplification capacity, so that the weakest signals will appear in its output at a predetermined minimum amplitude, and is also provided with a limiter which prevents stronger signals from materially exceeding this amplitude. The reliability of the circuit can further be increased by feeding the detected signals into a keying circuit which provides output signals of constant amplitude irrespective of the amplitude of the input.

The nature and operation of the invention may be more clearly understood from the following detailed description, taken in connection with the drawing, wherein the single figure is a circuit diagram of an operative apparatus with the exception of the antenna circuit, and preamplifier (if used), and the telegraph printer itself, which are not shown.

The equipment shown in the diagram may be fed directly from an antenna or a preamplifier, or, in case the transmission is at a higher frequency, the signals may be taken from the output of a preliminary intermediate frequency amplifier. Assuming the latter, a common frequency of operation is 455 kilocycles. I prefer, for convenience, to operate the equipment with frequencies of this order, but it is to be understood that this is a matter of convenience and not of necessity, and that where frequencies are mentioned herein they are considered as illustrative of what I believe to be best practice, and are not to be taken as limitations.

The 455 kilocycle frequency is fed through the input terminals 1 of the equipment shown through a tuning circuit comprising a condenser 3 and variable inductor 5. One input circuit of a conventional pentagrid converter tube 7, such, for example, as a 6SA7, is connected across the inductor 5. The first grid of this tube is connected to the output circuit of a, say, 400-kilocycle oscillator 9. The oscillator shown is a conventional electron coupled type, and hence will not be described in detail since it is of a kind well known in the art and there are many other oscillator circuits which could equally well be used.

The 55-kilocycle output of the converter tube feeds through a lead 11 to a tuned circuit 13, which, through a blocking condenser 15, feeds an amplifier tube 17. Grid bias is supplied to this tube in a conventional manner. It is contemplated that some amplitude limitation may occur in this tube, in that, particularly on strong signals, sufficient excitation will be provided partially to saturate it.

Proper screen grid and plate voltages for the tube 17 are supplied, respectively, through resistors 19 and 21, by-passed by a condenser network 23, and connected to a positive supply bus 25. The tube 17 is connected to a double-tuned output transformer comprising the coupled tuned circuits 27 and 29.

The important feature of this transformer is that it shall respond equally to the mark and space frequencies. One way of accomplishing this is to tune both of the resonant circuits to the average of these two frequencies, and so to adjust the coupling that the well known "double hump" characteristic of such coupled circuits brings the maximum response of the two humps into coincidence with these frequencies. Assuming a difference of 850 cycles (a common value) between the mark and the space frequencies, and the mean frequency as 55 kilocycles, this would mean that the two resonant circuits would each be tuned to 55 kilocycles and the two humps would be, respectively, at 54,575 and 55,425 cycles, each of these, it will be noted, being less than one percent off of the mean frequency. It is not, however, necessary that the coupling be adjusted with this accuracy, since equivalent results can be obtained with either a sharply peaked or a flat-top response, just so long as the mean frequency is accurately centered. It should, however, be mentioned at this point, that all of the adjustments mentioned, both heretofore and those hereafter to be described, represent optima. It is a basic characteristic of this equipment that a degree of discrimination or wave shaping is applied at each step of the reception of the signal, so that minor variations tend to cancel out, and none of the adjustments are as critical as might be inferred or as would be necessary were each stage in the operation upon the signal to be considered separately.

The output circuit 29 of the transformer connects between ground and the grid of a pentode amplifier tube 31. Complete limitation of the amplitude of input signals to this tube occurs in the grid circuit. This is accomplished by a connection 33 from the grid of this tube to one plate of a double diode 35 (lower center of the figure) which is biased weakly by its own contact potentials, and draws no current until the input voltage exceeds the bias value. For oscillations exceeding this value it draws current, offering very little impedence and so loading the secondary circuit 29 of the transformer as to permit practically no rise of potential above the bias value. The use of a diode as a "dynamic limiter" is known in the art, and is shown here as merely one way of accomplishing this result.

The pentode 31 has its plate connected to the primary coil 37 of a double-secondary transformer 39, plate voltage being supplied through a resistor 41 connected to the common high potential positive bus 25. As may be inferred from the method of supply, no particular effort need be made accurately to control the plate voltage. The screen grid voltage, however, is accurately controlled, and is supplied from a bus 43. The means of controlling the screen voltage will be described later, since the same considerations apply to all of the pentode tubes used in the equipment from this point on. As is well known, the characteristics of a pentode tube are substantially unchanged by rather wide variations in plate load or voltage, so long as the screen grid potential is maintained at a constant value, and this fact is taken advantage of throughout the equipment.

The two secondaries 47 and 49 of the transformer 39 are sharply tuned, respectively, to the mark and space frequencies by the condensers 51 and 53. The coupling between the two secondaries should be kept at a minimum. They are, of course, coupled to some extent through the primary coil 37, but the impedance of the tube 31 is so high that this coupling has little effect upon the tuning of the two selective circuits. While the tuning of these circuits should be sharp, it is not necessary that the special precautions required with ultra-high Q circuits be exercised with respect to them; their Q should preferably be as high as is compatible with stability under ordinary operating conditions.

Each of the two selective circuits is connected between ground and the control grid of the pentode amplifiers 55M and 55S respectively. Both of these tubes are biased to cut-off through a connection from their cathodes to a bus 57 which is maintained at a potential held to a constant value (in this case) of about 15 volts. Owing, in part, to the limitation of the input voltages supplied to tube 31, neither of these tubes draws appreciable grid current, and therefore no load is imposed upon the secondaries 47 and 49. The Q of the two selective circuits is therefore not affected as it would be if a conventional detector were included in the circuits.

The tubes used in the specific equipment here described are of the 6SJ7 type. These are sharp cut-off tubes of the pentode type, their screen grids being supplied with a regulated voltage of about 105 volts from the screen grid bus 43. Under these circumstances they cut off substantially completely when their grids are 3 volts, or a little less, negative with respect to their cathodes.

The selective circuits are sufficiently sharp so that the maximum mark signal will develop about 16 volts crest across the coil 47 and about 12 volts crest across the coil 49, these values being reversed for the space signal. Since the grids of both tubes are biased to about 15 volts negative, the 12-volt signal in the out-of-tune selective circuit is not sufficient to make the tube connected to it carry current at all, whereas the 16-volt peak swing of the tube connected to the in-tune circuit conducts throughout the range from twelve to sixteen volts positive, or four volts peak to peak; something less than two volts effective. Under the amplifying action of the tube this appears in the output circuit of the tube as a 55-kilocycle oscillation (plus or minus 425 cycles) of about twenty volts.

The plates of the two tubes 55M and 55S are connected to corresponding doubly-tuned output transformers 59M and 59S respectively. Both of these transformers, being sharply tuned, are selective to the frequencies fed to them and, accordingly, are subject to a short build-up period while the oscillations which they carry reach maximum amplitude. This fact is taken advantage of in the equipment to follow. The secondaries of these transformers feed two substantially identical rectifier circuits, comprising the rectifiers 61M and 61S respectively, in series with resistors 63M and 63S. Each of these resistors is bridged by a condenser 65 for by-passing the high frequency component, and connects, through resistors 67M and 67S to a reversing switch 69, which connects to the output leads, 71 and 72, of this portion of the apparatus.

Like sides of the two rectifiers (positive or negative, as the case may be) are connected together through lead 73.

It may be well to mention at this point, although it should be apparent, that reference to any parts of the circuit as responding to mark or space signals is purely arbitrary, since it may, at any time, be desired to interchange the signals used for these two purposes. The switch 69 permits this interchange.

It will be noted that the two rectifier circuits are connected in opposition. Excitation of tube 55M, with the switch 69 thrown in one direction, will place a positive potential upon one of the output leads 71, while excitation of tube 55S will, under the same conditions, place a positive potential upon the other of the two leads. If through failure of the limiter both of the tubes are excited simultaneously, the potential difference between these leads will be the difference of the two amplified potentials, and the output will still be of the correct polarity. The same will be true if the circuits including coils 47 and 49 are not balanced accurately for equal maximum response. It may be observed that the portion of the circuit just described bears a superficial resemblance to conventional FM discriminators of the Foster and Seely type. There is no resemblance in operation, however, as the Foster-Seely device depends on phase relations which have no significance in the functioning of my equipment.

Mention has been made of the constant voltages applied to the control grids of tubes 55 through the lead 57, and to the screen grids of these same tubes. In this equipment the primary potential source is the ordinary A. C. supply lines connecting with a conventional full-wave rectifier 73, supplied, as is customary, with an auxiliary winding 75 for feeding the heater circuits of all of the tubes, these heaters being omitted in the drawing for the sake of simplicity. The rectifier connects to the usual choke 77 and filter condenser 79.

The positive side of the condenser 79 is connected to the positive bus 25, supplying the plates of all of the amplifier tubes, and the negative side of the condenser is connected to ground in the usual manner. The constant potential biases supplied to tubes 55M and 55S, and other tubes later to be mentioned, are obtained from the cathode drop in these and other tubes connected to the same circuit. Instead, however, of using a cathode resistor of the ordinary type, these cathode circuits connect through a lead 81 to the grid and plate, connected together, of a mercury vapor grid-glow tube 83, such as a type 884, the cathode of which is connected to the negative side of the rectifier and ground. It is characteristic of tubes of the type mentioned that when their space current exceeds a certain very small value changes in such current have substantially no effect upon the voltage drop across the tube. The connection of the starter anode of the tube to the plate results in its activation by very low potentials. In the setup here described the normal plate currents of the tubes which are connected to the biasing circuits provide sufficient current to bring it to voltage saturation, but in a less elaborate device this condition could always be obtained by a resistor of fairly high value connected directly to the positive bus. The voltage appearing between cathode and plate of the tube is equal to the space current drop, which, under these conditions of use, remains constant at almost exactly 15 volts, the value desired. Since no load is imposed upon the grid circuits to which this voltage is applied it is possible, by bridging the tube with a high resistance voltage divider, such as the resistors 85 and 87, to supply any other lower constant potential that may be desired.

The constant potential required for the screen grids of the various tubes is supplied in a related but somewhat different manner. The positive bus 25 connects through a series resistor 89 (lower right of the figure) to the anode of a voltage regulator tube 91, in this case a tube of the type known alternatively as OC3, or VR–105. The screen grid bus 43 is connected to the junction between the resistor and the tube, and thus supplies a voltage that remains constant within plus or minus one percent or less over a variation of nearly forty milliamperes in the screen grid currents of the tube so supplied, which is far greater than any that actually occurs. This contributes enormously to the stability of the whole equipment, since it renders it substantially immune to any normal variation in the primary supply voltage.

The final unit of the system is the keying equipment which provides the relatively high current, high power required to operate the relays and solenoids of the printer telegraph. The output lead 71 from the detector circuit connects to the control grid of an amplifier tube 92, preferably of the beam power type. A small by-pass condenser 93 connects from grid to ground, to bleed off any high frequency which may remain in the rectifier circuit output. The plate connects through a resistor 95, of about 40,000 ohms, to the positive bus 25. The anode of a second voltage regulator tube 97 connects with the junction between the plate of tube 92 and the resistor 95. The second voltage regulator in this case is a OA3/VR–75. Its cathode connects to ground through a by-passed load resistor 99, of about 30,000 ohms, the high potential end of this resistor being connected, through a limiting resistor 101 (approximately 1 megohm) to the grid of a beam power output tube 103, such as 6L6. The plate of this tube connects through a milliammeter 105 to the negative output terminal 107. The positive output terminal 109 connects directly to the positive bus 25.

When a positive impulse is applied to the control grid of tube 92, the latter carries current, causing a large voltage drop across the resistor 95. This drop is sufficient to cause the potential across the regulator tube 97 to fall below the value which will maintain ionization, the tube extinguishes, and since current ceases to flow in the resistor 99, the drop across it becomes zero and the control grid of the output tube 103 falls to its extreme negative value, totally cutting off the current through the tube. This effect does not, however, take place instantly. Because of the resonant character of the transformers 59, a short interval is required for the potential across them to build up to its full value. The interval required for this to take place is an extremely small fraction of a second, but during this interval the current through the tube 92 increases and the potential across tube 97 decreases. Before tube 92 begins to draw current the voltage across tube 97 is constant at 75 volts, about 70 volts appearing across resistor 95 and 55 volts across the output resistor 99. Tube 97 does not, however, extinguish until the current through tube 92 builds up to about 3 milliamperes, which causes the drop through resistor 99 to exceed that at which excitation to tube 97 can be maintained. This provides a short refractory period between the time that the signal is applied to tube 92 and the time that tube 97 responds to it. This refractory period serves to prevent the keying circuit from operating in response to short sharp bursts of static, or, perhaps, local interference.

When the potential of the grid of tube 92 reverses in response to a signal applied to tube 55M, the approximately 20 volts negative applied is sufficient completely to cut off current through the tube. The potential on its plate accordingly rises, until tube 97 again fires, causing a positive voltage to appear across the resistor 99, and upon the grid of tube 103. This potential is limited, however, to a certain predetermined value by the second set of electrodes in the double diode 35, the plate of this pair of electrodes being connected to the grid, and the cathode back to the constant cathode bias bus 81. Accordingly, if the positive potential applied to the grid of tube 103 exceeds 15 volts (it might rise to 40 or more in the absence of the limiter), the diode will start to carry current and the drop through the resistor 101 will prevent further rise. Since the screen grid of tube 103 is also connected to the regulated source of screen voltage the current flowing in the plate circuit remains independent of supply voltage variations, even though the output terminals of the tube connect directly to the supply voltage source. The resistance of the apparatus to such changes is remarkable. The nominal 200-volt output of the rectifier may drop nearly to half, and as long as the screen grid voltages remain above the value fixed by tube 91, of 105 volts, the performance of the equipment will remain unimpaired.

Similarly, the keying unit is unaffected by large changes in input voltages. When the grid of tube 92 is positive, its voltage may fall from the normal 20 as low as 10 without causing the tube 103 to carry current and interfering with the space condition of the equipment. Similarly, when the grid of tube 92 is negative, a reduction of its voltage to half will not decrease the current in the output of tube 103. The voltage on the grid of this latter tube is limited rigidly between 15 volts minus, as established by the constant positive value of the cathode with the grid effectively connected directly to ground, and zero, as regulated by the diode electrodes 35, which prevents the grid assuming a positive value in excess of that of the cathode.

It is this same principle, i. e., that of making the response in the output circuit independent of malfunctions in the inputs, which gives the entire device its remarkable reliability. Little difficulty is experienced balancing modern rectifiers, and if the elements 61M and 61S are selected at random, the voltages developed in the rectifier circuits, with equal input, will be sensibly the same. Even if they are not, however, the voltages applied to the grid of tube 92 will still be reversed in sign and of sufficient magnitude to operate the tubes. With the regulated control grid and screen grid voltages on tubes 55, they will likewise function in substantially identical fashion, but again, if they do not, the result is not of major moment. This likewise holds true of the balance in response between the tuned circuits 47—51 and 49—53.

The limiter in the grid circuit of tube 31 normally restricts its output to the point where neither of the tubes 55 carries current in response to a signal intended for the other, but if this current value is exceeded the responses in the two selective circuits rise proportionally, and the differential output in the rectifier circuits remains substantially the same or may even rise. Taken in combination, these factors insure that the device remains operative at a high degree of efficiency even though its various adjustments may be considerably off of the desired values, and the adjustment of the circuits is sufficiently simple so that it is highly unlikely that such maladjustment should occur at all.

It is convenient to connect an indicator tube 111 across the input lead 71 and ground. This is shown as a cathode ray "electric eye," 6AL7, which flashes in response to mark signals. It is unimportant to the present invention except as showing the derivation of a controlled potential less than that appearing across tube 83.

Considered operatively, the major characteristic of the whole circuit is its ability to cut through violent interference and produce clear-cut, well-formed, readable signals. This, of itself, enables it to operate in the presence of fading severe enough to disrupt communication completely in more conventional circuits.

When fading is so complete as to result in the complete disappearance of signals no single receiver can cope with it and the only palliative is diversity reception. In the ordinary case, however, the signal is still present although it may have sunk far below the noise level. If this be the difficulty the device described can ordinarily still produce highly satisfactory results. Interference occurring on a definite well-defined frequency can almost always be taken care of by frequency selection. Much more difficult to handle is random-frequency noise, wherein sudden powerful transients shock excite an antenna, which, with its oscillating circuits, passes its own frequency on through all selective equipment. Such shock-excited oscillations may appear in the output coil 37 of the discriminator circuit. The selective circuits, including the coils 47 and 49, will be equally affected by such oscillations, although, because of the limiter action, they will not rise above the limited value in magnitude. Even though the signal may be much lower than this value, and the amplitude of the transient itself may be high enough to cause both tubes 55 to conduct, they will do so in substantially equal amounts and the differential voltage developed in their outputs will be substantially zero, whereas, by the principle of superposition, the sustained oscillations due to the signals will still remain in these circuits in their normal ratio, and produce the required differential potential in the output circuits.

As a result of the combination of all of these factors, the device will operate under conditions where communication would appear to be impossible. With it I have been able to carry on continuous, errorless communication through interference so strong that even the presence of the communication signals could not be detected, either by ear, or upon the screen of the cathode ray oscillograph connected to the output of the ordinary radio receiver and audioamplifier.

It should be clear, both from what has been stated directly and from the comments on the latitudes of adjustments possible, that the invention herein is not restricted to the conformation of apparatus or to the tubes and values of other circuit elements here described. The description is not, therefore, to be considered as limiting the invention, for which I desire protection as broadly as is set forth in the following claims.

I claim:

1. A detector for frequency-shift telegraph signals comprising an intermediate-frequency amplifier, a pair of sharply resonant circuits fed by said amplifier, one of said circuits being tuned to mark frequency and the other to space frequency, a pair of vacuum tubes fed respectively by said resonant circuits, means for normally biasing said tubes below cut-off by an amount substantially equal to or greater than the difference in response of said resonant circuit to mark and space signals of normal amplitude and a pair of rectifiers fed by said tubes respectively.

2. Apparatus in accordance with claim 1 including a common output circuit for said rectifiers, the latter being connected in said circuit in opposition to provide a reversal of potential therein accordingly as one or the other of said vacuum tubes is excited above cut-off.

3. Apparatus in accordance with claim 1 including means for limiting the amplitude of signals fed to said intermediate-frequency amplifier.

4. A detector circuit for frequency-shift telegraph signals comprising an amplifier substantially equally responsive to the mark and space signals to be received, means for limiting the amplitude of said signals to a pretetermined maximum value, a pair of high Q output circuits for said amplifier, said circuits being tuned to maximum response, one to the mark frequency and the other to the space frequency, a pair of amplifier output tubes fed by said circuits respectively, means for applying to each of said tubes a bias exceeding the cut-off value for such tube by an amount substantially equal to the peak value of the lesser of the voltages applied thereto by said mark or space frequency signals and rectifying means fed by the respective output tubes.

5. Apparatus in accordance with claim 4 including a resonant output circuit connected to each of said output tubes, the resonant circuit being tuned to the same frequency as the selective circuit feeding the corresponding tube and connected to supply the rectifying means.

6. Apparatus in accordance with claim 4 including a resonant output circuit connected to each of said output tubes and tuned to the same frequency as the selective circuit feeding the corresponding tube, a pair of rectifiers fed by said resonant circuits respectively, and a common circuit connecting said rectifiers in opposition to produce a reversal of polarity in said common circuit in accordance with a transition from mark to space signals.

7. Apparatus in accordance with claim 4 including a resonant output circuit connected to each of said output tubes and tuned to the same frequency as the selective circuit feeding the corresponding tube, a pair of rectifiers fed by said resonant circuits respectively, a common circuit connecting said rectifiers in opposition to produce a reversal of polarity in said common circuit in accordance with a transition from mark to space signals, an unbiased tube fed by said common circuit, and means for supplying said last mentioned tube with operating potentials such that the negative potentials supplied thereto by said common circuit are in excess of its cut-off value.

8. A discriminator for frequency-shift signals differing in frequency by factors of the order of 2 percent which comprises a common circuit for said signals, means for limiting the amplitude of all signals in said circuit, a pair of resonant circuits coupled to said common circuit and tuned respectively to the frequencies to be discriminated, a pair of amplifiers fed respectively by said resonant circuiits, means for biasing said amplifiers to prevent response thereof to signals of less than a selected minimum amplitude supplied thereto from the resonant circuits, a rectifier connected in the output of each of said amplifiers, and a common circuit connecting said rectifiers in opposition.

GEORGE J. MAKI.

REFERENCES CITED

The following references are of record in the file of this patent:

UNITED STATES PATENTS

| Number | Name | Date |
| --- | --- | --- |
| 2,134,757 | Goldsmith | Nov. 1, 1938 |
| 2,186,895 | D'Humy | Jan. 9, 1940 |
| 2,265,826 | Wheeler | Dec. 9, 1941 |
| 2,302,834 | Bliss | Nov. 24, 1942 |
| 2,406,034 | Phelps | Aug. 20, 1946 |
| 2,457,207 | Carlson | Dec. 28, 1948 |